March 12, 1957     H. SOUTHWICK     2,784,578
BEVERAGE CAN HOLDER
Filed Oct. 29, 1954
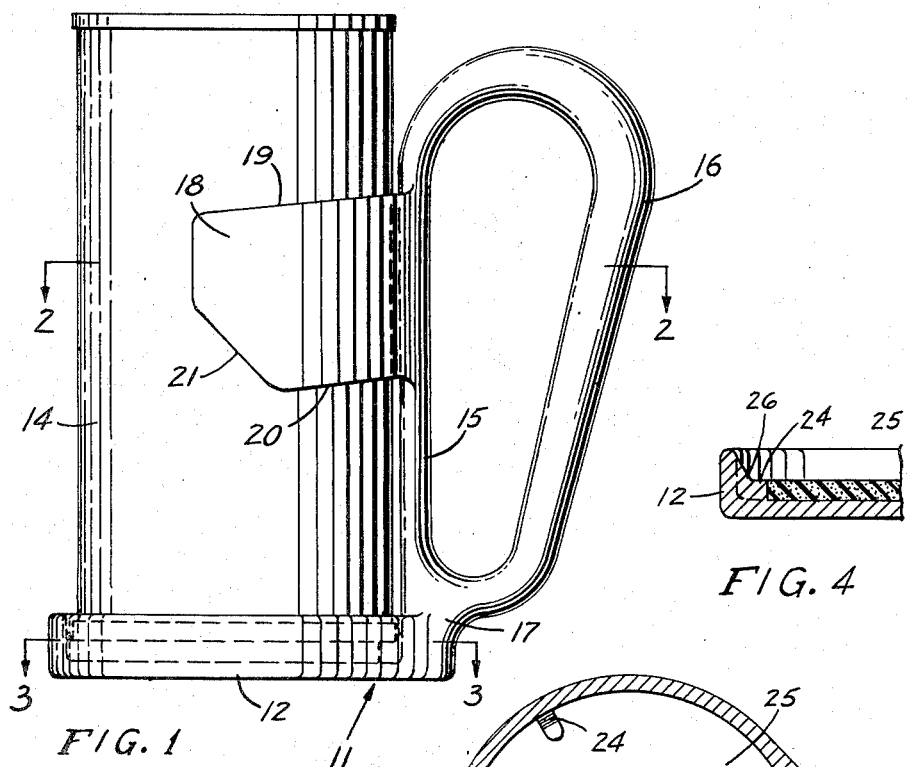
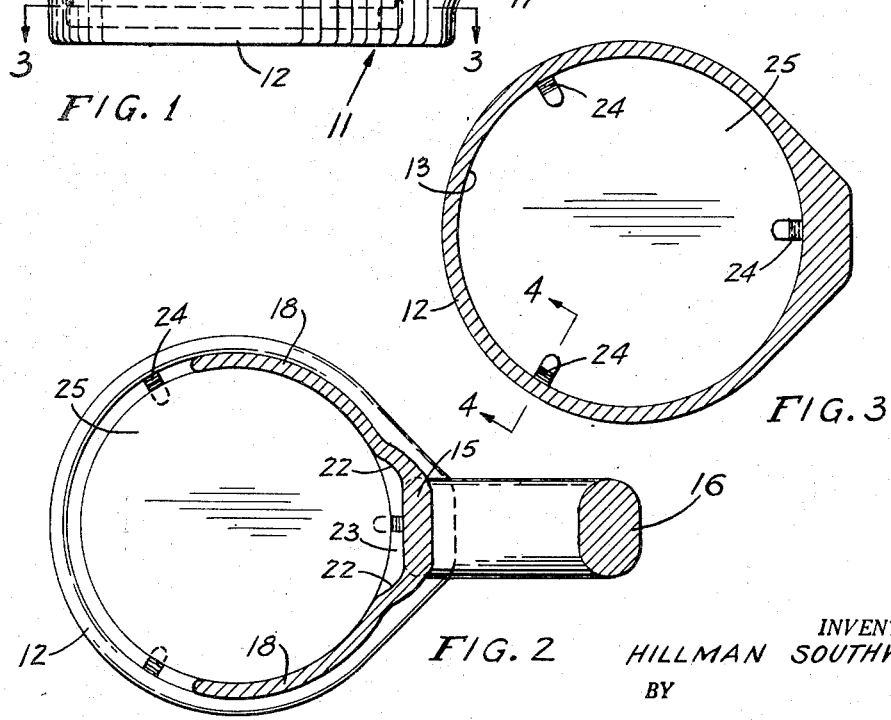
INVENTOR.
HILLMAN SOUTHWICK
BY
McMorrow, Berman + Davidson
ATTORNEYS

United States Patent Office 2,784,578
Patented Mar. 12, 1957

2,784,578

BEVERAGE CAN HOLDER

Hillman Southwick, Epps, La.

Application October 29, 1954, Serial No. 465,537

1 Claim. (Cl. 65—61)

This invention relates to holders for beverage containers, and more particularly to an improved holder for a beverage can.

The main object of the invention is to provide a novel and improved beverage can holder which is simple in construction, which is easy to mount on a beverage can, and which enables the user to drink the contents of the beverage can or other beverage container with which the device may be employed without risk of spilling the contents of the can or other container and without manual contact with the container or with condensate which may form on said container.

A further object of the invention is to provide an improved holder for a beverage can or similar beverage container, said holder being inexpensive to construct, being durable, being attractive in appearance, and providing protection for the surface of a table or other article of furniture on which the holder and the beverage container carried thereby may be supported.

Further objects and advantages of the invention will become apparent from the following description and claim, and from the accompanying drawings, wherein:

Figure 1 is a side elevational view of an improved beverage container holder constructed in accordance with the present invention, shown with a beverage can disposed therein.

Figure 2 is a horizontal cross sectional view taken on the line 2—2 of Figure 1.

Figure 3 is a horizontal cross sectional view taken on the line 3—3 of Figure 1.

Figure 4 is a fragmentary cross sectional detail view taken on the line 4—4 of Figure 3.

Referring to the drawings, the improved beverage container holder is designated generally at 11 and comprises a generally circular base 12 formed with a circular recess 13 shaped to receive the lower end of a beverage container, such as a beverage can 14. Integrally formed with the base 12 is the upstanding vertical arm 15, said arm being located at the margin of the base and being formed integrally with a handle 16 which connects the top end of the arm 15 to the base at 17.

Designated at 18, 18 are a pair of resilient arms integrally formed with the upper portion of the arm 15, said arms being arcuate in shape and extending over the base 12 on opposite sides thereof, the arms overlying opposite side portions of the margin of the base, as shown in Figure 2. The resilient arms 18 are arranged to clampingly engage the body of a beverage container, such as the beverage can 14, to secure the container on the base 12 in the manner shown in Figure 1.

As shown in Figure 2, the arms 18 are of substantial arcuate length and extend forwardly beyond the transverse diameter of the beverage container 14, so that the container is securely held on the base 12. The top edges 19 of the arms 18 slope downwardly and forwardly, as shown in Figure 1, and the bottom edges 20 of said arms similarly slope downwardly and forwardly. The lower forward portions of the arms are beveled, as shown at 21. Thus, condensate from the surface of the container 14 will flow downwardly and forwardly along the edges of the arms 18 and will never flow rearwardly toward the vertical arm 15 and handle 16.

As is clearly shown in Figure 2, the arcuate clip members 18 are forwardly offset relative to the arm 15 adjacent their connections with the arm, as shown at 22, 22, to define a clearance area 23 between the arm 15 and the beverage container 14, to prevent contact of the arm with the surface of the container, and hence to prevent flow of condensate from the container onto the arm 15.

The base 12 is formed with a plurality of spaced inwardly projecting L-shaped support ribs 24 at the margin of the recess 13, said ribs 24 being shaped to supportingly receive the bottom rim of the beverage can 14, or the bottom rim of any other container, such as a bottle or the like, with which the holder may be employed.

Designated at 25 is an absorbent supporting pad, of sponge rubber, or other suitable absorbent material, disposed in the recess 13 and being suitably recessed at its margins to receive the respective supporting ribs 24, whereby said ribs are lockingly engaged with the pad 25.

As shown in Figure 4, the supporting ribs 24 may be formed to define notches 26 of obtuse angular shape, to receive the rim portions of the beverage container.

The supporting pad 25 serves to absorb moisture dripping from the container 14 and to substantially prevent said moisture from coming directly into contact with the base 12.

As above explained, the holder may be employed with beverage cans, such as cans 14, but also is suitable for use with other beverage containers, such as bottles, or the like.

With a specific embodiment of an improved beverage can holder has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A holder for a beverage can having a bottom bead comprising a base formed with a recess shaped to receive the lower end and bottom bead of a beverage can, an upstanding arm rigidly secured to the margin of said base, a handle rigidly connecting the upper portion of the arm to said base, a pair of resilient opposed arcuate clip members secured to said arm and extending over the base at opposite sides thereof arranged to clampingly engage the body of a beverage can therebetween to secure said can on the base, said clip members being forwardly offset relative to said arm adjacent their connections with the arms to define a clearance area between the arm and the beverage can to prevent contact of the arm by condensate forming on the can, a plurality of spaced inwardly projecting L-shaped support ribs integrally formed on the base at the margin of said recess, and an absorbent supporting pad disposed in said recess and being recessed at its margin so as to receive and be lockingly engaged with said support ribs.

References Cited in the file of this patent

UNITED STATES PATENTS

| D. 91,786 | Panza | Mar. 20, 1934 |
| 547,713 | Courtenay | Oct. 8, 1895 |
| 829,950 | Conlin | Sept. 4, 1906 |
| 899,290 | Bricker | Sept. 22, 1908 |
| 2,075,685 | Wiedemann | Mar. 30, 1937 |
| 2,652,703 | Keegan | Sept. 22, 1953 |

FOREIGN PATENTS

| 376,083 | France | May 31, 1907 |